United States Patent
Hsu et al.

(10) Patent No.: US 8,277,742 B2
(45) Date of Patent: Oct. 2, 2012

(54) METHOD OF FABRICATION VISIBLE LIGHT ABSORBED TIO₂/CNT PHOTOCATALYSTS AND PHOTOCATALYTIC FILTERS

(75) Inventors: Wen-Kuang Hsu, Hsinchu (TW); Hsin-Fu Kuo, Hsinchu (TW); Shen-Yi Lu, Hsinchu (TW); Chiung-Wen Tang, Hsinchu (TW); Yu-Hsien Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 175 days.

(21) Appl. No.: 12/662,212

(22) Filed: Apr. 6, 2010

(65) Prior Publication Data

US 2011/0194990 A1  Aug. 11, 2011

(30) Foreign Application Priority Data

Feb. 6, 2010 (TW) ................. 99103615 A

(51) Int. Cl.
*B01J 8/02* (2006.01)
*B01J 35/02* (2006.01)
*B01J 19/00* (2006.01)
*B01J 19/08* (2006.01)
*C01B 31/00* (2006.01)
*C01B 31/02* (2006.01)

(52) U.S. Cl. ................. 422/211; 422/129; 423/445 B; 423/445 R

(58) Field of Classification Search ................ 422/211, 422/129; 502/102, 350, 105; 977/734, 742–752; 423/445 B, 445 R
See application file for complete search history.

(56) References Cited

U.S. PATENT DOCUMENTS

| | | | |
|---|---|---|---|
| 7,459,013 B2* | 12/2008 | Holmes et al. | 96/132 |
| 2003/0147802 A1* | 8/2003 | Smalley et al. | 423/447.3 |
| 2007/0196575 A1* | 8/2007 | Dominguez et al. | 427/249.1 |
| 2009/0075157 A1* | 3/2009 | Pak et al. | 429/44 |
| 2009/0175757 A1* | 7/2009 | Yao et al. | 422/4 |
| 2009/0186214 A1* | 7/2009 | Lafdi et al. | 428/336 |
| 2010/0178825 A1* | 7/2010 | Shah et al. | 442/188 |
| 2010/0254885 A1* | 10/2010 | Menchhofer et al. | 423/447.1 |
| 2011/0135827 A1* | 6/2011 | Kim et al. | 427/310 |

OTHER PUBLICATIONS

Sheng-Yi Lu, Chiung-Wen Tang, Tu-Hsien Lin, Hsin-Fu Kuo, Yao-Cheng Lai, Meng-Yen Tsai, Hao Ouyang, and Weng-Kuang Hsu, TiO2-Coated Carbon Nanotubes: A Redshift Enhanced Photocatalysis at Visible Light; Applied Physics Letters 96, 231915 2010, Jun. 11, 2010, American Institute of Physics.

* cited by examiner

*Primary Examiner* — Jennifer A Leung
*Assistant Examiner* — Natasha Young
(74) *Attorney, Agent, or Firm* — Bacon & Thomas, PLLC

(57) ABSTRACT

A method of fabricating visible light absorbed TiO₂/CNT photocatalysts and photocatalytic filters is disclosed, in which the method of fabricating the photocatalysts comprises steps: (a) providing a substrate; (b) forming a plurality of carbon nanotubes on the substrate; (c) providing a titanium source and an oxygen source; and (d) forming at least one titanium dioxide layer on the carbon nanotubes. The filter of the present invention comprises: a substrate, a plurality of carbon nanotubes, and a titanium dioxide layer. The plurality of carbon nanotubes form on the surface of the substrate, one end of each carbon nanotube connects to the substrate, and the titanium dioxide layer covers the surface of the carbon nanotubes. The filter of the present invention is a visible light absorbed filtering net, the titanium dioxide layer formed on the CNTs has high uniformity and therefore the photodegradation efficiency of the filter is an improvement.

15 Claims, 4 Drawing Sheets

METHOD OF FABRICATION VISIBLE LIGHT ABSORBED TIO₂/CNT PHOTOCATALYSTS AND PHOTOCATALYTIC FILTERS

BACKGROUND OF THE INVENTION

1. Field of the Invention

The present invention relates to method of fabricating $TiO_2$/CNT photocatalysts and a photocatalytic filter provided by the same and, more particularly, to a method of fabricating visible light absorbed $TiO_2$/CNT photocatalysts and a photocatalytic filter provided by the same.

2. Description of Related Art

A photocatalyst is a material that can provide various functions such as sterilization, deodorization, and cleaning by the free radicals thereof being generated after exposure to light. Many materials have been taken as the photocatalyst material, and among them titanium dioxide is the mostly used one. In the prior arts, a titanium dioxide film is usually formed by using a sol-gel method, but the provided photocatalyst titanium dioxide film can work (be able to generate free radicals) only under the exposure to UV lights. Therefore, if a conventional photocatalyst titanium dioxide film is illuminated with visible light (with wavelength of longer than 400 nm), free radicals cannot be generated since only with the exposure to UV lights can the conventional photocatalyst be excited to an excited state. Accordingly, when a conventional photocatalyst titanium dioxide film is used to provide functions such as sterilization, deodorization, and cleaning, an artificial UV light source should be provided to illuminate the photocatalyst otherwise the photocatalyst can be used only at an outdoor site, i.e., with naturally-occurring UV.

US 2005/0239644 disclosed a method of fabricating photocatalysts, in which an active sol-gel is coated on a substrate to provide a titanium dioxide film. The precursor used therein comprises n-butyl titanate, ethane, diethanolamine, and water. However, the photocatalysts titanium dioxide film provided thereof still cannot operate without the illumination of UV lights, whereby the application of the photocatalysts is quite limited to the environment having naturally-occurring UV light or should be assisted with an artificial UV light source.

Reference with FIG. 1, a conventional photocatalyst filter is shown, which is made by dipping a cloth such as a polyethylene fiber cloth in a titanium dioxide solution to form a titanium dioxide layer 12 on the cloth fiber 11, and subsequently followed with a drying process. However, the surface area of the formed titanium dioxide layer is small due to the small surface area of the fiber cloth, which results in a small active surface of the photocatalyst filter. Also, some titanium dioxide molecules may aggregate and form agglomeration (granules) thus reducing the uniformity of titanium dioxide layer and resulting in a negative influence to the photodegradation efficiency of the photocatalyst.

Therefore, it is desirable to provide an improved photocatalyst filter and a method of providing the same to obviate the aforementioned problems and enable the photocatalyst filter to be usable (operable) under the exposure of visible light and UV light.

SUMMARY OF THE INVENTION

The present invention provides a method of fabricating visible light absorbed $TiO_2$/CNT photocatalysts, which comprises steps: (a) providing a substrate; (b) forming a plurality of carbon nanotubes on the substrate; (c) providing a titanium source and an oxygen source; and (d) forming at least one titanium dioxide layer on the carbon nanotubes.

The photocatalysts made by the method of the present invention are visible light absorbed photocatalysts that can be workable with visible light, LTV light, or both (not only workable with UV light exposure). The photocatalysts having $TiO_2$/CNT structure made by the method of the present invention can be applied to a wider range compared with that of prior arts due to the visible light absorbed characteristic thereof, the titanium dioxide layer formed on the CNTs has high uniformity and therefore the photodegradation efficiency of the photocatalysts made by the method of the present invention is an improvement.

According to the method of fabricating photocatalysts of the present invention, the step (d), preferably the titanium dioxide layer may be formed on the carbon nanotubes by an atomic layer deposition method. When an atomic layer deposition method is used to form the titanium dioxide layer, a titanium dioxide layer with high uniformity can be obtained without the appearance of titanium dioxide agglomeration (granules) that are frequently seen in the conventional titanium dioxide layers formed by the sol-gel method. Therefore, the visible light absorbed $TiO_2$/CNT photocatalysts formed by the method of the present invention have excellent photodegradation efficiency compared with that of the prior arts.

According to the method of fabricating photocatalysts of the present invention, in the step (d), preferably the titanium source may be selected from a group consisted of: titanium tetrachloride, tetraethoxy titanium, titanium isopropoxide, and mixtures thereof; and preferably the oxygen source may be selected from a group consisted of: water, hydrogen peroxide, oxygen, ozone, and mixtures thereof.

According to the method of fabricating photocatalysts of the present invention, preferably the formation of the titanium dioxide layer in the step (d) is performed at a temperature of 50 to 400° C.; a pressure of 1 to 50 mbar; and an atmosphere comprising an inert gas such as nitrogen, neon, argon, krypton, xenon, or mixtures thereof.

Preferably, the method of fabricating photocatalysts of the present invention may further comprise a step (e) after the step (d): removing the substrate to obtain a plurality of carbon nanotubes covered with the titanium dioxide layer. The carbon nanotubes lifted from the substrate are presented in a form of powder, which can be further applied to various usages such as sterilization powder, paint additives, fertilizer, or sanitary articles.

According to the method of fabricating photocatalysts of the present invention, preferably the step (d) may be repeated for 1 to 1500 times.

According to the method of fabricating photocatalysts of the present invention, the thickness of single titanium dioxide layer is preferably 0.5 Å to 1.7 Å, more preferably 0.5 Å to 1.0 Å.

The method of fabricating photocatalysts of the present invention preferably further comprises a step (d1) after the step (d): annealing the carbon nanotubes that are located on the substrate and covered with the titanium dioxide layer.

According to the method of fabricating photocatalysts of the present invention, the substrate is preferably a silicon-based substrate, a quartz substrate, or a glass substrate. Also, the substrate may preferably be a carbon fiber cloth in order to provide a photocatalyst filter.

According to the method of fabricating photocatalysts of the present invention, in the step (b), the carbon nanotubes may be preferably single-wall or multi-wall carbon nanotubes.

The present invention also provides a photocatalytic filter, which comprises: a substrate, a plurality of carbon nanotubes, and a titanium dioxide layer. The carbon nanotubes locate on the substrate, wherein ends of the carbon nanotubes connect to the substrate. Also, the titanium dioxide layer covers the surface of the carbon nanotubes.

The photocatalytic filter of the present invention is a visible light absorbed photocatalysts filter that can be workable with visible light and therefore can be applied into various uses such as the filtering net of an air conditioner without the limitation of the using of UV light sources. That is, there is no need to install UV light source equipment to provide artificial UV lights for the photocatalysts filter. In contrast, a traditional photocatalyst filter cannot work if the UV light exposure is absent, the photocatalyst of the traditional filters may lose its photocatalysis feature if no UV light is provided and therefore is limited to the place where it is used.

In the prior arts, a photocatalysts filter is made by dipping a fiber cloth in a solution of titanium dioxide to form a titanium dioxide layer on the fiber cloth. Consequently, the surface area of the active surface of the photocatalysts filter is small since the surface area of the fiber cloth, on where the titanium dioxide layer can be formed, is small, and hence the photocatalysis efficiency cannot be efficiently increased. In the present invention, the area of the surface where the titanium dioxide layer can be formed on is relatively large, because plural carbon nanotubes formed on the carbon fiber cloth may serve as bases for titanium dioxide layer to coat on. Therefore, the photocatalysis efficiency of the photocatalyst filter according to the present invention is an improvement.

According to the photocatalytic filter of the present invention, the substrate is preferably a carbon fiber cloth.

According to the photocatalytic filter of the present invention, the thickness of the titanium dioxide layer is preferably 0.5 Å to 1000 Å.

According to the photocatalytic filter of the present invention, the titanium dioxide layer covering the surface of the carbon nanotubes is preferably formed by an atomic layer deposition method.

According to the photocatalytic filter of the present invention, the length of the carbon nanotubes is preferably 5-300 μm, but is not limited thereto.

According to the photocatalytic filter of the present invention, the carbon nanotubes may preferably be single-wall or multi-wall carbon nanotubes.

Other objects, advantages, and novel features of the invention will become more apparent from the following detailed description when taken in conjunction with the accompanying drawings.

DETAILED DESCRIPTION OF THE PREFERRED EMBODIMENT

Example 1

Figure 1:
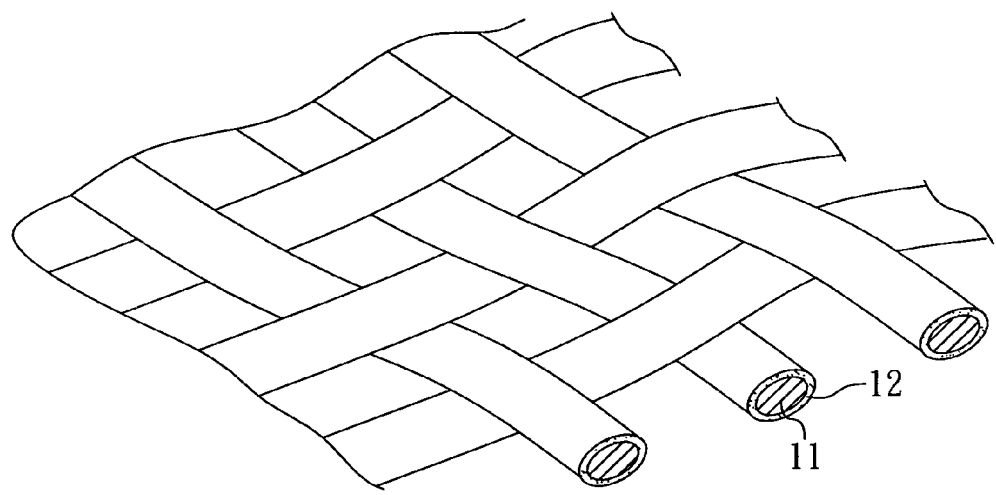
FIG. 1 is a schematic view of a conventional photocatalyst filter.
Figure 2A:
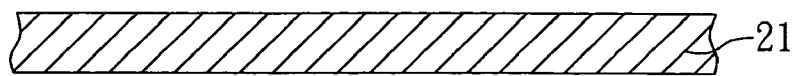
FIGS. 2A-2C show a process flow chart of fabricating a visible light absorbed $TiO_2$/CNT photocatalysts of the example 1.
Figure 2B:
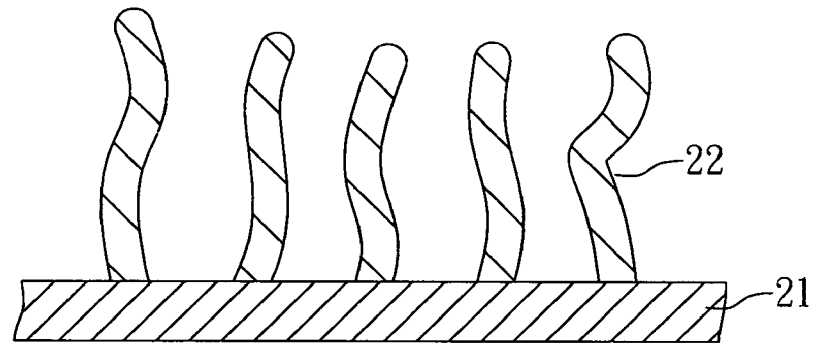
Figure 2C:
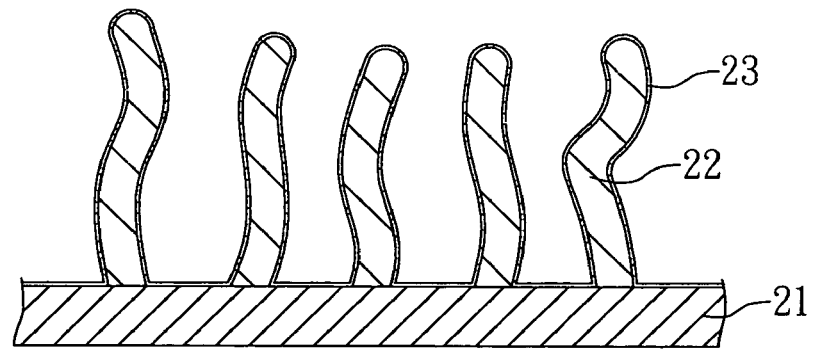

Reference with FIGS. 2A-2C, a process flow chart of fabricating a visible light absorbed $TiO_2$/CNT photocatalysts is shown. First, (a) a substrate 21 is provided as shown in FIG. 2A, wherein a silicon-based substrate is used. Then, (b) a plurality of carbon nanotubes 22 is formed on the substrate 21 by a CVD method, as shown in FIG. 2B. After that, (c) a titanium source and an oxygen source (not shown) are provided, and (d) by using an atomic deposition method, with conditions of 150° C. of temperature, 1 mbar of pressure, and a nitrogen atmosphere, the titanium source and the oxygen source are reacted to form a titanium dioxide layer 23 on the carbon nanotubes 22. Then, the above step (d) is repeated for 800 times to increase the thickness of the titanium dioxide layer 23. Subsequently, (d1) an annealing process is performed on the carbon nanotubes 22 coated with the titanium dioxide layer 23 (not shown). Therefore, a visible light absorbed photocatalysts comprising a substrate 21 having carbon nanotubes 22 thereon, in which the carbon nanotubes 22 are coated with the titanium dioxide layer 23, is obtained. In the present example, the titanium source used herein is titanium tetrachloride and the oxygen source used herein is water.

The photocatalyst of the present example is made by the utilizing of an atomic layer deposition method, the using of titanium tetrachloride as the titanium source, and the forming of nano-scaled titanium dioxide layer, and therefore is visible light absorbable, which cannot be realized by the conventional photocatalyst. The titanium dioxide layer of the photocatalysts of the present example has very high uniformity without the appearance of titanium dioxide agglomeration (granules) that are frequently seen in the conventional titanium dioxide layers formed by the sol-gel method. Therefore, the visible light absorbed $TiO_2$/CNT photocatalysts formed by the method of the present invention have excellent photodegradation efficiency compared with that of the prior arts. The photocatalysts having $TiO_2$/CNT structure made by the method of the present invention can be applied to a wider range compared with that of prior arts due to the visible light absorbed characteristic thereof, the titanium dioxide layer formed on the CNTs has high uniformity and therefore the photodegradation efficiency of the photocatalysts achieved by the method of the present invention is an improvement.

Example 2

The same method as described in the example 1 is used except that a carbon fiber cloth is used as the substrate 21 to replace the silicon-based substrate.

Figure 3:
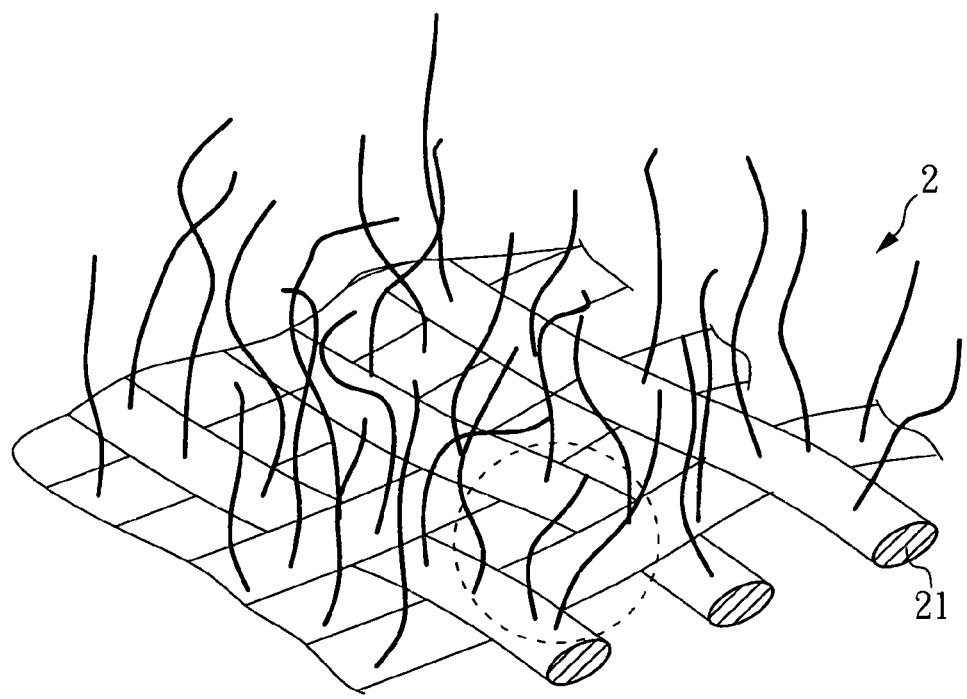
FIG. 3 is a schematic view of a photocatalyst filter of the example 2.
Figure 4:
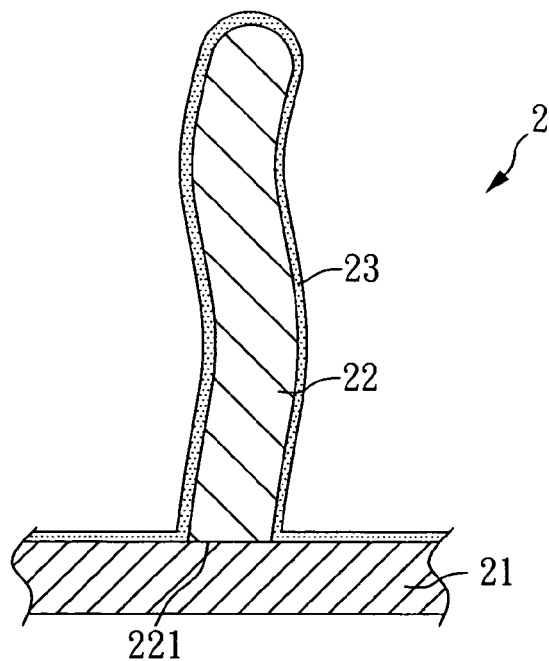
FIG. 4 is a schematic cross section view of a photocatalyst filter of the example 2.

Reference with FIGS. 3 and 4, a schematic view and a cross section view of a photocatalysts filter of the present example are shown, in which FIG. 4 is the enlarged view of the cycled part shown in the FIG. 3. The photocatalysts filter of the present example comprises a substrate 21 (i.e. the carbon fiber cloth), a plurality of carbon nanotubes 22, and a titanium dioxide layer 23. The carbon nanotubes 22 form on the surface of the substrate 21, ends 221 of the carbon nanotubes 22 connect to the surface of the substrate 21, and the titanium dioxide layer 23 covers the surface of the carbon nanotubes 22 formed on the substrate 21. The length of the carbon nanotubes 22 is about 300 μm.

According to the photocatalysts filter 2 of the present example, the titanium dioxide layer 23 is formed covering the carbon nanotubes 22 and the substrate 21 (i.e. the carbon fiber cloth) by an atomic layer deposition method, and therefore the photocatalysts filter 2 is visible light-absorbable and can be applied into various uses such as a filtering net of an air conditioner without the limitation of the using of UV light sources. That is, there is no need to install UV light source equipment to provide artificial UV lights for the photocatalysts filter. In contrast, a traditional photocatalyst filter cannot work if the UV light exposure is absent, the photocatalyst of the traditional filters may lose its photocatalysis feature if no UV light is provided and therefore is limited to the place where it is used.

Also, the traditional photocatalyst filter may have a problem is that the active surface thereof is small since the surface area of the fiber cloth, where the titanium dioxide layer can be formed on, is small, and hence the photocatalysis efficiency cannot be efficiently increased. In the present invention, the area of the surface on where the titanium dioxide layer can be formed is relatively large, because plural carbon nanotubes formed on the carbon fiber cloth may serve as bases for titanium dioxide layer to coat on. Therefore, the photocatalysis efficiency of the photocatalyst filter according to the present invention can be efficiently increased.

Meanwhile, the energy band structure of the photocatalyst filter may be changed due to the core/shell (carbon nanotube/titanium dioxide layer) structure of the present invention, which may contribute to the increasing of the light absorbing efficiency and the photocatalysis efficiency of the photocatalyst filter.

Example 3

Figure 5A:
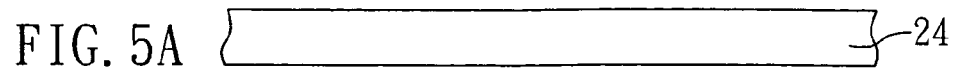
FIGS. 5A-5D show a process flow chart of fabricating a visible light absorbed $TiO_2$/CNT photocatalysts of the example 3.
Figure 5B:
Figure 5C:
Figure 5D:
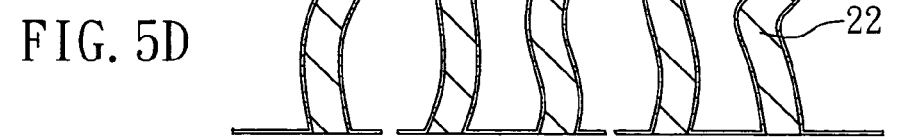

Reference with FIGS. 5A-5D, a process flow chart of fabricating a visible light absorbed $TiO_2$/CNT photocatalysts is shown. First, (a) a silicon-based substrate 24 is provided as shown in FIG. 5A. Then, (b) a plurality of carbon nanotubes 22 is formed on the substrate 24 by a CVD method, as shown in FIG. 5B. After that, (c) a titanium source and an oxygen source (not shown) are provided, and (d) by using an atomic deposition method, with conditions of 150° C. of temperature, 1.5 mbar of pressure, and at a nitrogen atmosphere, the titanium source and the oxygen source are reacted to form a titanium dioxide layer 23 on the carbon nanotubes 22. Then, the above step (d) is repeated for 800 times to increase the thickness of the titanium dioxide layer 23. Subsequently, (d1) an annealing process is performed on the carbon nanotubes 22 coated with the titanium dioxide layer 23 (not shown). Finally, the silicon-based substrate 24 is removed to obtain the photocatalysts of the present example, as shown in FIG. 5D, wherein the photocatalysts of the present example comprises carbon nanotubes 22 coated with the titanium dioxide layer 23. In the present example, the titanium source used herein is titanium tetrachloride and the oxygen source used herein is water.

The photocatalysts prepared in the present example may be used as visible light absorbed photocatalyst powders and can be applied into various uses such as sterilization powder, paint additives, fertilizer, or sanitary articles.

Accordingly, the present invention produces a method of fabricating visible light absorbed $TiO_2$/CNT photocatalysts by utilizing an atomic layer deposition method with the use of titanium tetrachloride as the titanium source and water as the oxygen source, and therefore the photocatalysts made by the present invention are visible light absorbable, which cannot be realized by the conventional photocatalyst. According to the present invention, the titanium dioxide layer of has very high uniformity without the appearance of titanium dioxide agglomeration (granules) that are frequently seen in the conventional titanium dioxide layers formed by the sol-gel method. Therefore, the visible light absorbed $TiO_2$/CNT photocatalysts formed by the method of the present invention have excellent photodegradation efficiency compared with that of the prior arts.

Meanwhile, the present invention provides a photocatalyst filter having a core/shell (carbon nanotube/titanium dioxide layer) structure, and as a result the photocatalyst filter of the present invention is visible light absorbable and can be applied into various uses such as filtering net of an air conditioner without the limitation of the using of UV light sources. That is, there is no need to install UV light source equipment to provide artificial UV lights for the photocatalysts filter. In contrast, a traditional photocatalyst filter cannot work when the UV light exposure is absent, the photocatalyst of the traditional filters may lose its photocatalysis feature while no UV light is provided and therefore is limited to the place where it is used (i.e., a site with naturally-occurring UV light).

In the prior arts, a photocatalysts filter is made by dipping a fiber cloth in a solution of titanium dioxide to form a titanium dioxide layer on the fiber cloth. Consequently, the surface area of the active surface of the photocatalysts filter is small since the surface area of the fiber cloth, where the titanium dioxide layer can be formed on, is small, and hence the photocatalysis efficiency cannot be efficiently increased. In the present invention, the area of the surface on where the titanium dioxide layer can be formed on is relatively large, because plural carbon nanotubes formed on the carbon fiber cloth may serve as bases for titanium dioxide layer to coat on. Therefore, the photocatalysis efficiency of the photocatalyst filter according to the present invention is an improvement.

Although the present invention has been explained in relation to its preferred embodiment, it is to be understood that many other possible modifications and variations can be made without departing from the scope of the invention as hereinafter claimed.

What is claimed is:

1. A method of fabricating visible light absorbed $TiO_2$/CNT photocatalysts, which comprises steps:
    (a) providing a substrate;
    (b) forming a plurality of carbon nanotubes on the substrate;
    (c) providing a titanium source and an oxygen source; and
    (d) forming at least one titanium dioxide layer on the carbon nanotubes, wherein the titanium dioxide layer is formed with a high uniformity without the appearance of titanium dioxide agglomeration.

2. The method as claimed in claim 1, wherein in the step (d), the titanium dioxide layer is formed on the carbon nanotubes by an atomic layer deposition method.

3. The method as claimed in claim 1, wherein in the step (c), the titanium source is selected from a group consisted of: titanium tetrachloride, tetraethoxy titanium, titanium isopropoxide, and mixtures thereof.

4. The method as claimed in claim 1, wherein in the step (c), the oxygen source is selected from a group consisted of: water, hydrogen peroxide, oxygen, ozone, and mixtures thereof.

5. The method as claimed in claim 1, wherein in the step (d), the forming of the titanium dioxide layer is performed in an atmosphere comprising: nitrogen, neon, argon, krypton, xenon, or mixtures thereof.

6. The method as claimed in claim 1, further comprising a step (e) after the step (d): removing the substrate to obtain a plurality of carbon nanotubes covered with the titanium dioxide layer.

7. The method as claimed in claim 1, wherein the step (d) is repeated for 1 to 1500 times.

8. The method as claimed in claim 1, wherein the thickness of single titanium dioxide layer is 0.5 Å to 1.7 Å.

9. The method as claimed in claim 1, further comprising a step (d1) after the step (d): annealing the carbon nanotubes that are locating on the substrate and covered with the titanium dioxide layer.

10. The method as claimed in claim 1, wherein the substrate is a silicon-based substrate, a quartz substrate, or a glass substrate.

11. The method as claimed in claim 1, wherein the substrate is a carbon fiber cloth.

12. A photocatalytic filter, which comprises:
a substrate,
a plurality of carbon nanotubes located on the substrate, wherein ends of the carbon nanotubes connect to the substrate, and
a titanium dioxide film layer covering the surface of the carbon nanotubes to form a core/shell structure, wherein the core is the carbon nanotube, and the shell is the titanium dioxide film layer, the titanium dioxide film layer having high uniformity without the appearance of titanium dioxide agglomeration.

13. The photocatalytic filter as claimed in claim 12, wherein the substrate is a carbon fiber cloth.

14. The photocatalytic filter as claimed in claim 12, wherein the thickness of the titanium dioxide film is 0.5 Å to 1000 Å.

15. The photocatalytic filter as claimed in claim 12, wherein the length of the carbon nanotubes is 5-300 μm.

* * * * *